United States Patent
Gupta et al.

(10) Patent No.: US 6,917,965 B2
(45) Date of Patent: Jul. 12, 2005

(54) FACILITATING ANNOTATION CREATION AND NOTIFICATION VIA ELECTRONIC MAIL

(75) Inventors: Anoop Gupta, Woodinville, WA (US); David M Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 09/396,701

(22) Filed: Sep. 15, 1999

(65) Prior Publication Data

US 2001/0042098 A1 Nov. 15, 2001

Related U.S. Application Data

(60) Provisional application No. 60/100,452, filed on Sep. 15, 1998.

(51) Int. Cl.[7] ............................. G06F 15/16; G09G 5/00
(52) U.S. Cl. ....................... 709/206; 345/752; 345/700; 345/704
(58) Field of Search ................................. 709/204, 206, 709/207, 217, 218, 201, 202, 203, 109; 345/707, 968, 716, 752; 707/1, 500, 512; 379/93.24, 89.2, 908, 100.08

(56) References Cited

U.S. PATENT DOCUMENTS

| | | | |
|---|---|---|---|
| 4,649,499 A | | 3/1987 | Sutton et al. |
| 5,333,266 A | | 7/1994 | Boaz et al. ................... 395/200 |
| 5,524,193 A | * | 6/1996 | Covington et al. .......... 707/512 |
| 5,526,407 A | * | 6/1996 | Russell et al. ................. 379/89 |
| 5,572,643 A | * | 11/1996 | Judson ........................... 379/88 |
| 5,583,980 A | | 12/1996 | Anderson |
| 5,600,775 A | * | 2/1997 | King et al. ................... 707/500 |
| 5,633,916 A | | 5/1997 | Goldhagen et al. ............ 379/67 |
| 5,699,089 A | | 12/1997 | Murray ........................ 345/146 |
| 5,732,216 A | | 3/1998 | Logan et al. ........... 395/200.33 |
| 5,809,250 A | | 9/1998 | Kisor |
| 5,838,313 A | * | 11/1998 | Hou et al. ................... 345/302 |
| 5,893,087 A | * | 4/1999 | Wlaschin et al. ............... 707/3 |
| 5,893,110 A | | 4/1999 | Weber et al. |
| 5,903,892 A | | 5/1999 | Hoffert et al. |

(Continued)

FOREIGN PATENT DOCUMENTS

| | | | | |
|---|---|---|---|---|
| EP | 0 650 126 A1 | 4/1995 | ........... | G06F/17/00 |
| GB | 2 301 260 A | 11/1996 | ........... | H04M/3/50 |
| WO | WO 97/49251 | 12/1997 | ........... | H04N/11/00 |

OTHER PUBLICATIONS

Microsoft Office 97, 2nd Ed. Moseley, L., Boodey, D. Sybex Inc., 1997, pp. 812–816, and 756–763.*

Integrated multimedia messages concepts and applications, Sysmposium on Applied Computing, Proceedings of the 1996, ACM, ISBN: 0–89791–820–7, 1996, Philadelphia, Pennsylvania, pp. 12–16.*

Abowd et al., "Teaching and Learning as Multimedia Authoring: The Classroom 2000 Project", Proceedings of the Multimedia '96, Boston, MA, USA, Nov 1996, ACM Press, pp. 187–198.

Bessler et al., DIANE: A Multimedia Annotation System, Proceedings of the ECMAST '97, Milan, Italy, May 1997.

(Continued)

*Primary Examiner*—Jack B. Harvey
*Assistant Examiner*—Beatriz Prieto
(74) *Attorney, Agent, or Firm*—Perkins Coie LLP

(57) ABSTRACT

A network system includes a client computer that can present multimedia content to a user and an annotation server that can transmit, to the client computer, annotations for the multimedia content. Users can be presented with annotations generated by other users and can create their own annotations that can be viewed by others. Users can be notified of new annotations by an electronic mail (email) message, can create new annotations by email messages, and can easily access a temporal segment of multimedia content corresponding to a new annotation based on information in email messages.

33 Claims, 12 Drawing Sheets

U.S. PATENT DOCUMENTS

| | | | |
|---|---|---|---|
| 5,923,848 A | * 7/1999 | Goodhand et al. | 709/219 |
| 5,969,716 A | 10/1999 | Davis et al. | |
| 5,991,365 A | * 11/1999 | Pizano et al. | 379/88.1 |
| 6,006,241 A | 12/1999 | Purnaveja et al. | |
| 6,009,462 A | * 12/1999 | Birrell et al. | 709/206 |
| 6,081,829 A | * 6/2000 | Sidana | 709/203 |
| 6,085,185 A | 7/2000 | Matsuzawa et al. | |
| 6,105,055 A | * 8/2000 | Pizano et al. | 709/204 |
| 6,144,375 A | 11/2000 | Jain et al. | |
| 6,173,287 B1 | 1/2001 | Eberman et al. | |
| 6,173,317 B1 | 1/2001 | Chaddha et al. | |
| 6,230,172 B1 | 5/2001 | Purnaveja et al. | |
| 6,311,189 B1 | 10/2001 | deVries et al. | |
| 6,317,141 B1 | 11/2001 | Pavley et al. | |
| 6,332,144 B1 | 12/2001 | deVries et al. | |
| 6,360,234 B2 | 3/2002 | Jain et al. | |
| 6,366,296 B1 | 4/2002 | Boreczky et al. | |
| 6,438,566 B1 | 8/2002 | Okuno et al. | |
| 6,449,653 B2 | 9/2002 | Klemets et al. | |
| 6,452,615 B1 | 9/2002 | Chiu et al. | |
| 6,484,156 B1 | 11/2002 | Gupta et al. | |
| 6,571,295 B1 | 5/2003 | Sidana | |
| 6,584,479 B2 | 6/2003 | Chang et al. | |

OTHER PUBLICATIONS

Carrer et al., "An Annotation Engine for Supporting Video Database Population", Multimedia Tools and Applications 5, 1997, Kluwer Academic Publishers, pp. 233–258.

Chalfonte et al., "Expressive Richness: A Comparison of Speech and Text as Media for Revision", Proceedings of the CHI' 91, 1991, ACM Press, pp. 21–26.

Davis et al., CoNote System Overview, 1995, Available at http://www.cs.cornell.edu/home/dph/annotation/annotations.html.

Gaines et al., "Open Architecture Multimedia Documents", Proceedings of the Multimedia '93, Anaheim, CA, Aug 1993, ACM Press, pp. 137–146.

Gould et al., "Relativity Controller: Reflecting User Perspective in Document Spaces," Adjunct Proceedings of INTERCHI '93, 1993, ACM Press, pp. 125–126.

Kim et al., "VIRON: An Annotation–Based Video Information Retrieval System," Proceedings of COMPSAC '96, Seoul, South Korea, Aug 1996, IEEE Press, pp. 298–303.

Laliberte et al., "A Protocol for Scalable Group and Public Annotations", 1997 NCA Technical Proposal, available at http://union.ncsa.uiuc.edu/~liberte/www/scalable–annotations.html.

Lawton et al., "The Knowledge Weasel Hypermedia Annotation System", Proceedings of the HyperText '93, Nov 1993, ACM Press, pp. 106–117.

Lee et al., "Video Indexing—An Approach Based on Moving Object and Track", Proceedings of the SPIE, vol. 1908, 1993, pp. 25–36.

Marshall, "Toward and Ecology of Hypertext Annotations", Proceedings of the HyperText, Pittsburgh, PA, Jun. 1998, ACM Press, pp. 40–48.

Neuwirth et al., "Distributed Collaborative Writing: A Comparison of Spoken and Written Modalities for Reviewing and Revising Documents", Proceedings of the CHI '94, Boston, MA, Apr. 1994, ACM Press, pp. 51–57.

Phelps et al., "Multivalent Annotations, Proceedings of the First European Conference on Research and Advanced Technology for Digital Libraries", Pisa, Italy, Sep. 1997.

Roscheisen et al., "Shared Web Annotations as a Platform for Third–Party Value–Added, Information Providers: Architecture, Protocols, and Usage Examples", Technical Report CSDTR/DLTR 1997, Stanford University, Available at http://www.diglib.stanford.edu/rmr/TR/TR.html.

Schickler et al., "Pan–Browser Support for Annotations and Other Meta Information on the World Wide Web", Proceedings of the Fifth International World Wide Web Conference, Paris, France, May 1996, available at http://www5conf.inria.fr/fich_html/papers/p15/Overview.html.

Smith et al., "What Should a Wildebeest Say? Interactive Nature Films for High School Classrooms", Proceedings of the ACM Multimedia '97, Seattle, WA, Nov 1997, ACM Press, pp. 193–201.

Smith, M., "DynaText: An Electronic Publishing System", Computers and the Humanities 27, 1993, pp. 415–420.

Stanford Online: Masters in Electrical Engineering, http://scpd.stanford.edu/cee/telecom/onlinedegree.html.

Weber et al., "Marquee: A Tool for Real–Time Video Logging", Proceedings of CHI '94, Boston, MA, Apr. 1994, ACM Press, pp. 58–64.

Wei, S.X., "MediaWeaver—A Distributed Media Authoring System for Networked Scholarly Workspaces", Multimedia Tools and Applications 6, 1998, Kluwer Academic Publishers, pp. 97–111.

Roscheisen et al., "Beyond Browsing: Shared Comments, SOAPs, Trails, and On–Line Communities", Computer Networks and ISDN Systems 27, 1995, pp. 739–749.

Nerney, Chris, "RealNetworks unveils software line for multimedia displays", http://www.nwfusion.com, May 4, 1998, 2 pages.

Booker, Ellis, "Microsoft and RealNetworks Wage Media War", http://www.techweb.com, Jul. 10, 1998, 2 pages.

Bugaj, Stephan et al., "Synchronized Multimedia Integration Language (SMIL) 1.0 Specification", http://www.w9.org.TR/1998/REC–smil–19980615, Jun. 15, 1998, 40 pages.

Merriam Webster's Collegiate Dictionary; Tenth Edition; 1996; 5 pages.

Carrer, et al.; "An Annotation Engine for Supporting Video Database Population"; Multimedia Tools and Applications; 1997; pp. 1–30.

Chen, et al.; "Video and Audio: Organization and Retrieval in the WWW"; Available at http://vosaic.com/corp/papers/www5.html; Archived Jan. 28, 1998.

Gabbe et al.; "Towards Intelligent Recognition of Multimedia Episodes in Real–Time Applications", ACM, 1994, AT&T Bell Laboratories, pp. 227–236.

Multimedia E–mail: the Evolution Approach based on Adapters, Huang, et. al., Software–Practive and Experience, vol. 24(9), 785–800, Sep. 1994, pp. 785–800.*

* cited by examiner

FACILITATING ANNOTATION CREATION AND NOTIFICATION VIA ELECTRONIC MAIL

RELATED APPLICATIONS

This application claims priority to U.S. Provisional Application No. 60/100,452, filed Sep. 15, 1998, entitled "Annotations for Streaming Video on the Web: System Design and Usage", to Anoop Gupta and David M. Bargeron.

TECHNICAL FIELD

This invention relates to networked client/server systems and to methods of annotating multimedia content in such systems. More particularly, the invention relates to creation and notification of new annotations via electronic mail.

BACKGROUND OF THE INVENTION

The advent of computers and their continued technological advancement has revolutionized the manner in which people work and live. One such advancement is that of multimedia presentations, where presentations that used to be made in person (e.g., college lectures, workplace training sessions, etc.) can be provided to a computer user as multimedia data (e.g., video, audio, text, and/or animation data). Today, such presentations are primarily video and audio, but a richer, broader digital media era is emerging. Multimedia presentations provide many benefits, such as allowing the presentation data to be created at a single time yet be presented to different users at different times and in different locations throughout the world.

These multimedia presentations are provided to a user as synchronized media. Synchronized media refers to multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

Multimedia presentations may also include "annotations" relating to the multimedia presentation. An annotation is data (e.g., audio, text, video, etc.) that corresponds to a multimedia presentation. Annotations can be added by anyone with appropriate access rights to the annotation system. These annotations typically correspond to a particular temporal location in the multimedia presentation and can provide a replacement for much of the "in-person" interaction or "classroom discussion" that is lost when the presentation is not made "in-person" or "live". As part of an annotation, a user can comment on a particular point, to which another user (or lecturer/presenter) can respond in a subsequent annotation. This process can continue, allowing a "classroom discussion" to occur via these annotations.

However, in order to gain wide range acceptance of multimedia presentations and the use of annotations with such presentations, a user-friendly manner for interacting with the presentations should be available.

Additionally, it would be useful to be able to notify individuals when new annotations are added. In some systems, the author or other "owner" of a multimedia presentation can be notified by electronic mail (email) whenever someone adds a new annotation to the presentation. However, there are several problems with such systems. One such problem is that the author or creator of the annotation has no control over (or perhaps even knowledge of) who is being notified of the new annotation. Another problem is that in order for the author/owner of the presentation to view the annotation or to access the multimedia presentation, the author/owner must manually access the multimedia presentation and manually locate the portion corresponding to the new annotation.

The invention described below addresses these and other disadvantages of current annotations systems, facilitating annotation creation and notification via email.

SUMMARY OF THE INVENTION

A network system includes a client computer that can present multimedia content to a user and an annotation server that can transmit, to the client computer, annotations for the multimedia content. Users are presented with annotations generated by other users and can create their own annotations that can be presented to others. Users can be notified of new annotations by electronic mail (email), and can also create new annotations by email.

According to one aspect of the invention, a user creating a new annotation can identify one or more other users that are to be notified, by email, of the new annotation. Users to be notified by email can be identified manually by the annotation author, or alternatively a default user(s) to be notified by email can be associated with the media content. Additionally, group identifiers can be used to identify groups of users to be notified of the new annotation by email.

According to another aspect of the invention, an email message notifying a recipient of a new annotation also includes a user-selectable link for the temporal segment of multimedia content corresponding to the annotation. Upon receipt of the email message, the recipient can select the link and have the media server present, to the user, the temporal segment of multimedia content that corresponds to the annotation.

According to another aspect of the invention, a recipient of an email message notifying the recipient of a new annotation can create another new annotation by replying to the email message. The recipient can enter the new annotation content and select the "reply" option from his or her electronic mail application. Selection of the "reply" option sends the reply email message to the annotation server, which creates another new annotation using the content entered by the recipient.

According to another aspect of the invention, a new email message can be generated that includes the content for a new annotation but that is not in response to an email notification of a new annotation. This new email message includes the content for the new annotation as well as information that can be used by the annotation server to create a new annotation. Examples of such information include the multimedia content to which the new annotation corresponds, and the temporal range of the media content to which the new annotation corresponds.

According to another aspect of the invention, one or more annotations can be created by forwarding an email thread to the annotation server. Upon receiving an email thread, including multiple email messages that were forwarded to or replied to by various users, the annotation server creates a new annotation including all of these email messages. Alternatively, a separate annotation for each email message in the thread may be created.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Network Structure

Figure 1:
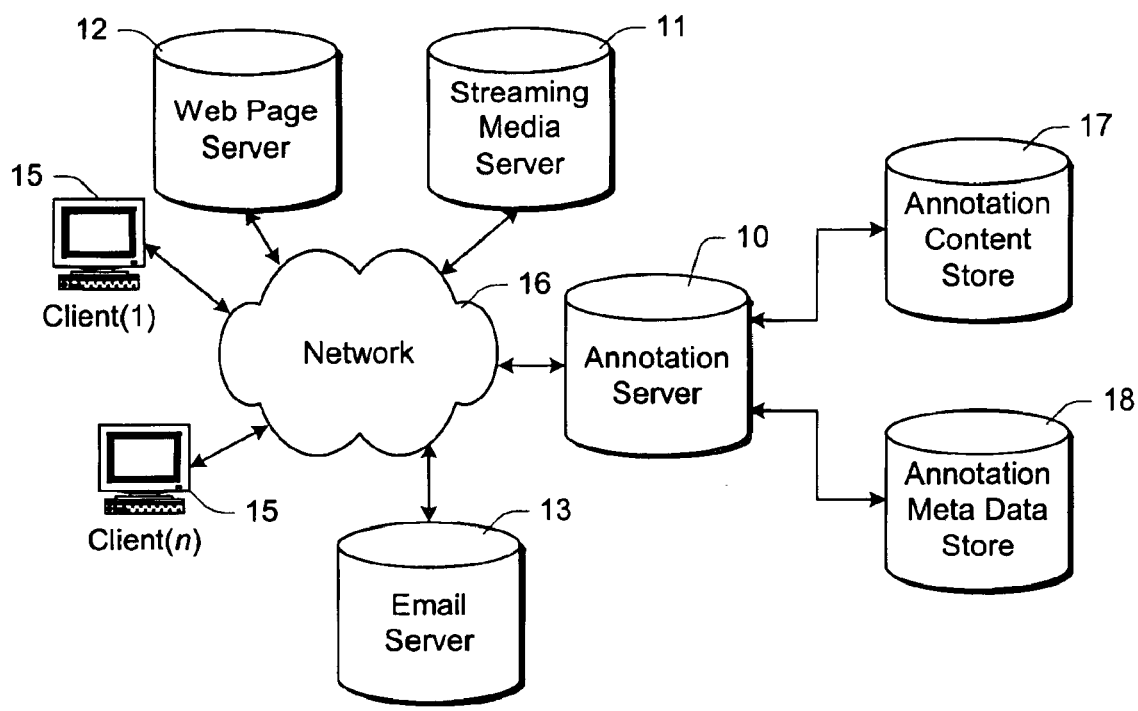
FIG. 1 shows a client/server network system and environment in accordance with one embodiment of the invention.

FIG. 1 shows a client/server network system and environment in accordance with one embodiment of the invention. Generally, the system includes multiple network server computers 10, 11, 12, and 13, and multiple (n) network client computers 15. The computers communicate with each other over a data communications network. The communications network in FIG. 1 comprises a public network 16 such as the Internet. The data communications network might also include, either in addition to or in place of the Internet, local-area networks and/or private wide-area networks.

Streaming media server computer 11 has access to streaming media content in the form of different media streams. These media streams can be individual media streams (e.g., audio, video, graphical, etc.), or alternatively can be composite media streams including two or more of such individual streams. Some media streams might be stored as files in a database or other file storage system, while other media streams might be supplied to the server on a "live" basis from other data source components through dedicated communications channels or through the Internet itself.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. Further details about ASF are available from Microsoft Corporation of Redmond, Wash.

Annotation server 10 controls the storage of annotations and their provision to client computers 15. The annotation server 10 manages the annotation meta data store 18 and the annotation content store 17. The annotation server 10 communicates with the client computers 15 via any of a wide variety of known protocols, such as the Hypertext Transfer Protocol (HTTP). The annotation server 10 can receive and provide annotations via direct contact with a client computer 15, or alternatively via electronic mail (email) via email server 13. The annotation server 10 similarly communicates with the email server 13 via any of a wide variety of known protocols, such as the Simple Mail Transfer Protocol (SMTP).

The annotations managed by annotation server 10 correspond to the streaming media available from media server computer 11. In the discussions to follow, the annotations are discussed as corresponding to streaming media. However, it should be noted that the annotations can similarly correspond to "pre-delivered" rather than streaming media, such as media previously stored at the client computers 15 via the network 16, via removable magnetic or optical disks, etc.

When a user of a client computer 15 accesses a web page containing streaming media, a conventional web browser of the client computer 15 contacts the web server 12 to request a Hypertext Markup Language (HTML) page. The client-based browser also submits requests to the media server 11 for streaming data, and the annotation server 10 for any annotations associated with the streaming data. When a user of a client computer 15 desires to add or retrieve annotations, the client computer 15 contacts the annotation server 10 to perform the desired addition/retrieval.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
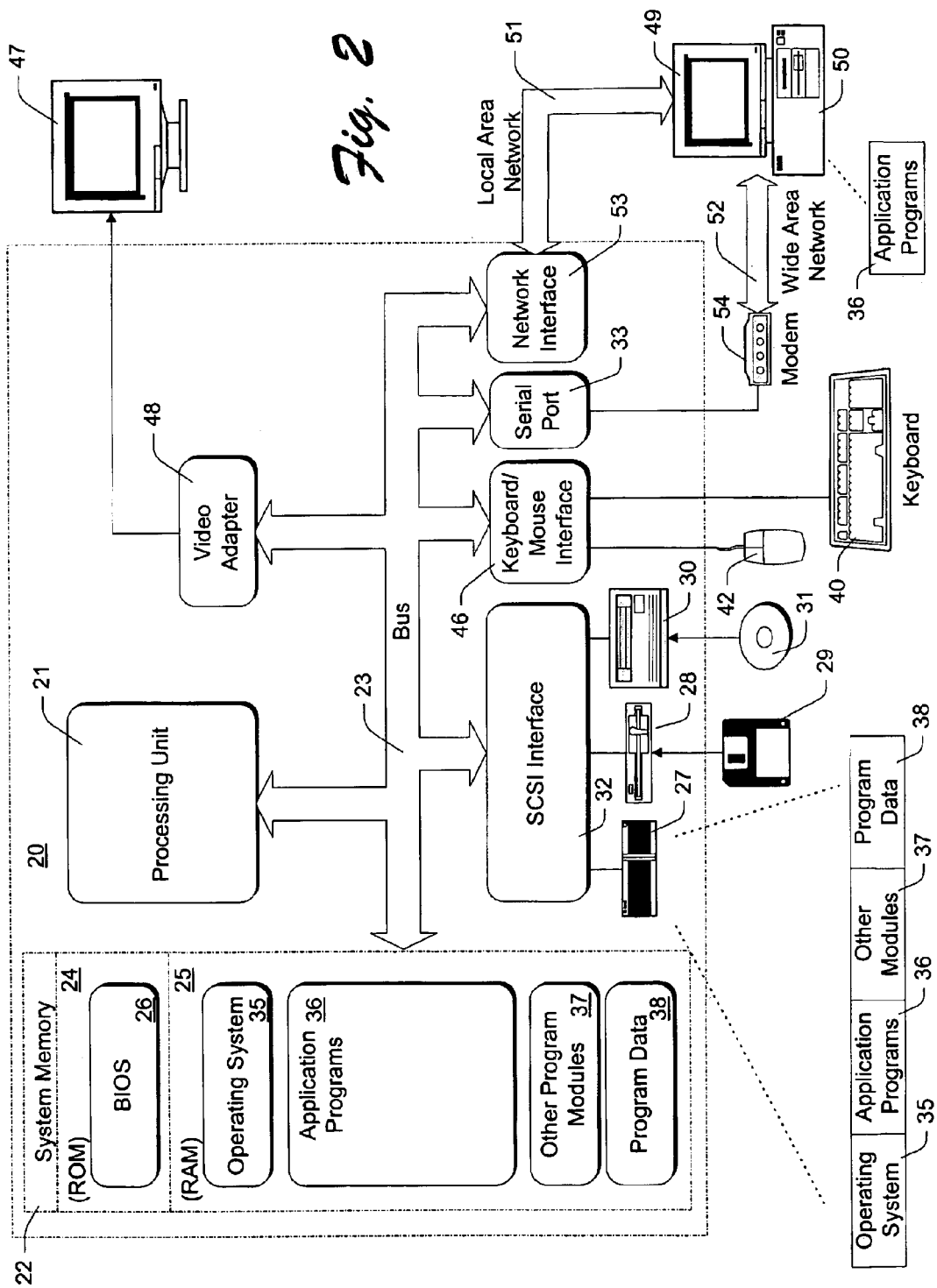
FIG. 2 shows a general example of a computer that can be used as a client or server in accordance with the invention.

FIG. 2 shows a general example of a computer 20 that can be used as a client or server in accordance with the invention. Computer 20 is shown as an example of a computer that can perform the functions of any of server computers 10–13 or a client computer 15 of FIG. 1.

Computer 20 includes one or more processors or processing units 21, a system memory 22, and a bus 23 that couples various system components including the system memory 22 to processors 21.

The bus 23 represents one or more of any of several types of bus structures, including a memory bus or memory controller, a peripheral bus, an accelerated graphics port, and a processor or local bus using any of a variety of bus architectures. The system memory includes read only memory (ROM) 24 and random access memory (RAM) 25. A basic input/output system (BIOS) 26, containing the basic routines that help to transfer information between elements within computer 20, such as during start-up, is stored in ROM 24. Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client/Server Relationship

Figure 3:
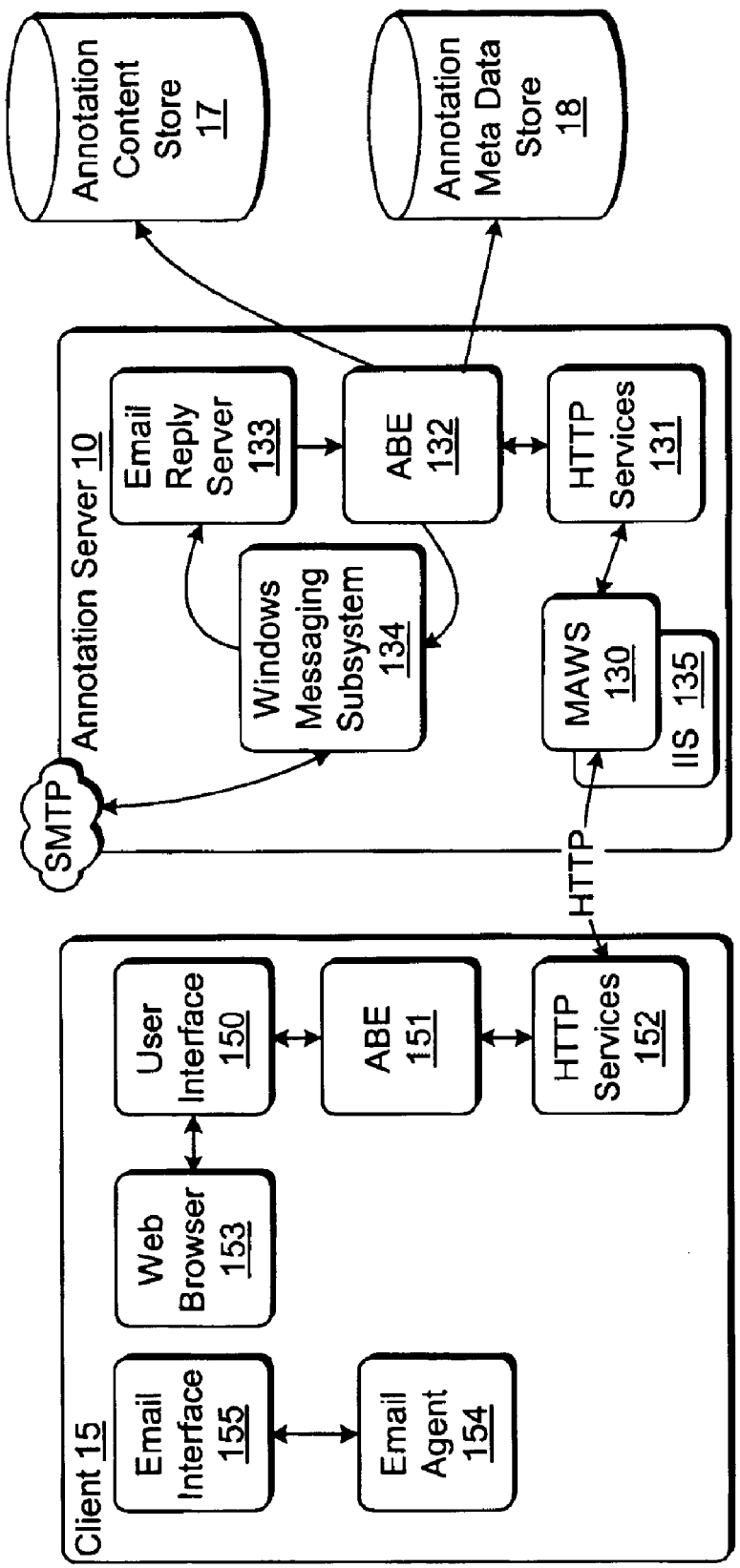
FIG. 3 illustrates an exemplary annotation server and a client computer in more detail.

FIG. 3 illustrates an exemplary annotation server and a client computer in more detail. As noted above, generally, commands are formulated at client computer 15 and forwarded to annotation server 10 via HTTP requests. In the illustrated embodiment of FIG. 3, communication between client 15 and server 10 is performed via HTTP, using commands encoded as Uniform Resource Locators (URLs) and data formatted as object linking and embedding (OLE) structured storage documents, or alternatively using Extensible Markup Language (XML).

Client 15 includes an HTTP services (HttpSvcs) module 152, which manages communication with server 10, and an annotation back end (ABE) module 151, which translates user actions into commands destined for server 10. A user interface (MMA) module 150 provides the user interface (UI) for a user to add and select different annotations and be presented with the annotations. According to one implementation, the user interface module 150 supports ActiveX controls that display an annotation interface for streaming video on the Web.

Client 15 also includes a web browser module 153, which provides a conventional web browsing interface and capabilities for the user to access various servers via network 16 of FIG. 1. Web browser 153 also provides the interface for a user to select particular media streams for presentation. The user can select which one of different versions of multimedia content he or she wishes to receive from media server 11 of FIG. 1. This selection can be direct (e.g., entry of a particular URL or selection of a "low resolution" option), or indirect (e.g., entry of a particular desired playback duration or an indication of system capabilities, such as "slow system" or "fast system"). Alternatively, other media presentation interfaces could be used.

Client 15 further includes an electronic mail (email) agent 154 and an email interface 155. Email agent 154 manages the generation, transmission, receipt, and storage of email messages at client 15. Email interface 155 provides the interface for a user to make use of the email services of email agent 154, including creating, modifying, deleting, responding to, etc. email messages. Email messages can be received by client 15 from other client computers or servers either directly or indirectly via an email server (e.g., email server 13 of FIG. 1). Additionally, new email messages, including replies to received email messages, can be forwarded to other client computers or servers on network 16 either directly or indirectly via an email server (e.g., email server 13). Any of a wide variety of conventional electronic mail protocols can be used by email agent 154 to send and receive email messages, such as SMTP.

Annotation server 10 includes the Multimedia Annotation Web Server (MAWS) module 130, which is an Internet Services Application Programming Interface (ISAPI) plug-in for Internet Information Server (IIS) module 135. Together, these two modules provide the web server functionality of annotation server 10. Annotation server 10 also includes an HTTP Services module 131 which manages communication with client 15. In addition, annotation server 10 utilizes the Windows Messaging Subsystem 134 to facilitate communication with email server 13 of FIG. 1, and an email reply server 133 for processing incoming email received from email server 13.

Annotation server 10 further includes an annotation back end (ABE) module 132, which contains functionality for accessing annotation stores 17 and 18, for composing outgoing email based on annotation data, and for processing incoming email. Incoming email to annotation server 10 is received and passed to the ABE module 132 by the Email Reply Server 133. If the incoming email includes the necessary information to generate an annotation, email reply server 133 converts the email into an annotation and forwards the annotation to ABE 132 for adding to annotation stores 17 and 18. Annotation content authored at client 15, using user interface 150, is received by ABE 132 and maintained in annotation content store 17. Received meta data (control information) corresponding to the annotation content is maintained in annotation meta data store 18.

The annotation content and meta data can be stored in any of a variety of conventional manners, such as in SQL relational databases (e.g., using Microsoft "SQL Server" version 7.0, available from Microsoft Corporation). Annotation server 10 is illustrated in FIG. 3 as maintaining the annotation content and associated control information (meta data) separately in two different stores. Alternatively, all of the annotation data (content and meta information) can be stored together in a single store, or content may be stored by another distinct storage system on the network 16 in FIG. 1, such as a file system, media server, email server, or other data store.

Annotation Storage Structure

Figure 4:
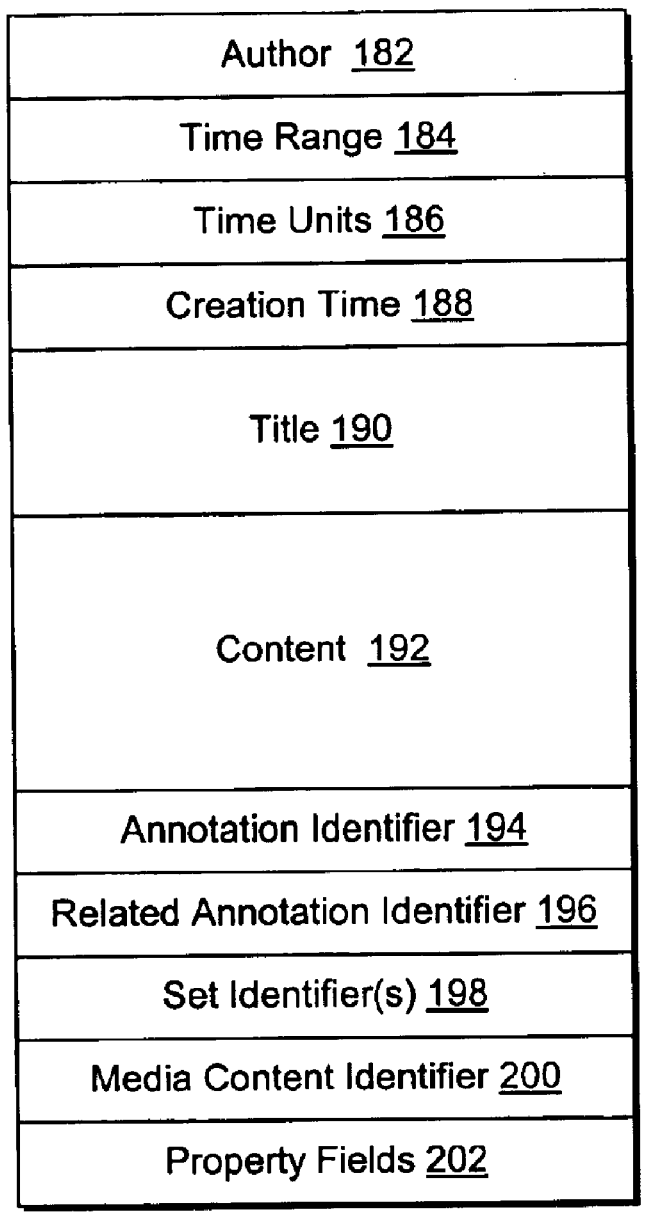
FIG. 4 shows an exemplary structure for an annotation entry that is maintained by an annotation server of FIG. 3.

FIG. 4 shows an exemplary structure for an annotation entry 180 that is maintained by annotation server 10 in annotation meta data store 18 of FIG. 3. In the illustrated embodiment, an annotation entry 180 includes an author field 182, a time range field 184, a time units field 186, a creation time field 188, a title field 190, a content field 192, an identifier field 194, a related annotation identifier field 196, a set identifier(s) field 198, a media content identifier field 200, and an arbitrary number of user-defined property fields 202. Each of fields 182–202 is a collection of data which define a particular characteristic of annotation entry 180. Annotation entry 180 is maintained by annotation server 10 of FIG. 3 in annotation meta data store 18. Content field 192, as discussed in more detail below, includes a pointer to (or other identifier of) the annotation content, which in turn is stored in annotation content store 17.

Author field 182 contains data identifying the user who created annotation entry 180 and who is therefore the author of the annotation's content. The author is identified by ABE 151 of FIG. 3 based on the user logged into client 15 at the time the annotation is created, or alternatively by ABE 132 based on the sender of an email message.

Time range field 184 contains data representing "begin" and "end" times defining a segment of media timeline with which annotation entry 180 is associated. Time units field 186 contains data representing the units of time represented in time range field 184. Together, time range field 184 and time units field 186 identify the relative time range of the annotation represented by annotation entry 180. This relative time range corresponds to a particular segment of the media stream to which annotation entry 180 is associated. The begin and end times for the annotation are provided by the user via interface 150 of FIG. 3, or alternatively can be automatically or implicitly derived using a variety of audio and video signal processing techniques, such as sentence detection in audio streams or video object tracking.

It should be noted that the time ranges for different annotations can overlap. Thus, for example, a first annotation may correspond to a segment ranging between the first and fourth minutes of a media stream, a second annotation may correspond to a segment ranging between the second and seventh minutes of the media stream, and a third annotation may correspond to a segment ranging between the second and third minutes of the media stream.

Alternatively, rather than using the presentation timeline of the media content, different media characteristics can be used to associate the annotation with a particular segment(s) of the media content. For example, annotations could be associated with (or "anchored" on) specific objects in the video content, or specific events in the audio content.

Creation time field 188 contains data specifying the date and time at which annotation entry 180 is created. It should be noted that the time of creation of annotation entry 180 is absolute and is not relative to the video or audio content of the media stream to which annotation entry 180 is associated. Accordingly, a user can specify that annotations which are particularly old, e.g., created more than two weeks earlier, are not to be displayed. ABE 132 of FIG. 3 stores the creation time and date when the annotation is created.

Title field 190 contains data representing a title by which the annotation represented by annotation entry 180 is identified. The title is generally determined by the user and the user enters the data representing the title using conventional and well known user interface techniques. The data can be as simple as ASCII text or as complex as HTML code which can include text having different fonts and type styles, graphics including wallpaper, motion video images, audio, and links to other multimedia documents.

Content field 192 contains data representing the substantive content of the annotation as authored by the user. The actual data can be stored in content field 192, or alternatively content field 192 may store a pointer to (or other indicator of) the content that is stored separately from the entry 180 itself. The user enters the data representing the content using conventional and well known user interface techniques. The content added by the user in creating annotation entry 180 can include any one or more of text, graphics, video, audio, etc. or links thereto. In essence, content field 192 contains data representing the substantive content the user wishes to include with the presentation of the corresponding media stream at the relative time range represented by time range field 184 and time units field 186.

Annotation identifier field 194 stores data that uniquely identifies annotation entry 180, while related annotation identifier field 196 stores data that uniquely identifies a related annotation. Annotation identifier field 194 can be used by other annotation entries to associate such other annotation entries with annotation entry 180. In this way, threads of discussion can develop in which a second annotation responds to a first annotation, a third annotation responds to the second annotation and so on. By way of example, an identifier of the first annotation would be stored in related annotation identifier field 196 of the second annotation, an identifier of the second annotation would be stored in related annotation identifier field 196 of the third annotation, and so on.

Set identifier(s) field 198 stores data that identifies a particular one or more sets to which annotation entry 180 belongs. A media stream can have multiple sets of annotations, sets can span multiple media content, and a particular annotation can correspond to one or more of these sets. Which set(s) an annotation belongs to is identified by the author of the annotation. By way of example, a media stream corresponding to a lecture may include the following sets: "instructor's comments", "assistant's comments", "audio comments", "text comments", "student questions", and each student's personal comments.

Media content identifier field 200 contains data that uniquely identifies particular multimedia content as the content to which annotation entry 180 corresponds. Media content identifier 200 can identify a single media stream (either an individual stream or a composite stream), or alternatively identify multiple different streams that are different versions of the same media content. Media content identifier 200 can identify media versions in a variety of different manners. According to one embodiment, the data represents a real-time transport protocol (RTP) address of the different media streams. An RTP address is a type of uniform resource locator (URL) by which multimedia documents can be identified in a network. According to an alternate embodiment, a unique identifier is assigned to the content rather than to the individual media streams. According to another alternate embodiment, a different unique identifier of the media streams could be created by annotation server 10 of FIG. 3 and assigned to the media streams. Such a unique identifier would also be used by streaming media server 11 of FIG. 1 to identify the media streams. According to another alternate embodiment, a uniform resource name (URN) such as those described by K. Sollins and L. Mosinter in "Functional Requirements for Uniform Resource Names," IETF RFC 1733 (December 1994) could be used to identify the media stream.

User-defined property fields 202 are one or more user-definable fields that allow users to customize the annotation system. Examples of such additional property fields include a "reference URL" property which contains the URL of a web page used as reference material for the content of the annotation; a "help URL" property containing the URL of a help page which can be accessed concerning the content of the annotation; a "view script" property containing JavaScript which is to be executed whenever the annotation is viewed; a "display type" property, which gives the client user interface information about how the annotation is to be displayed; etc.

Figure 5:
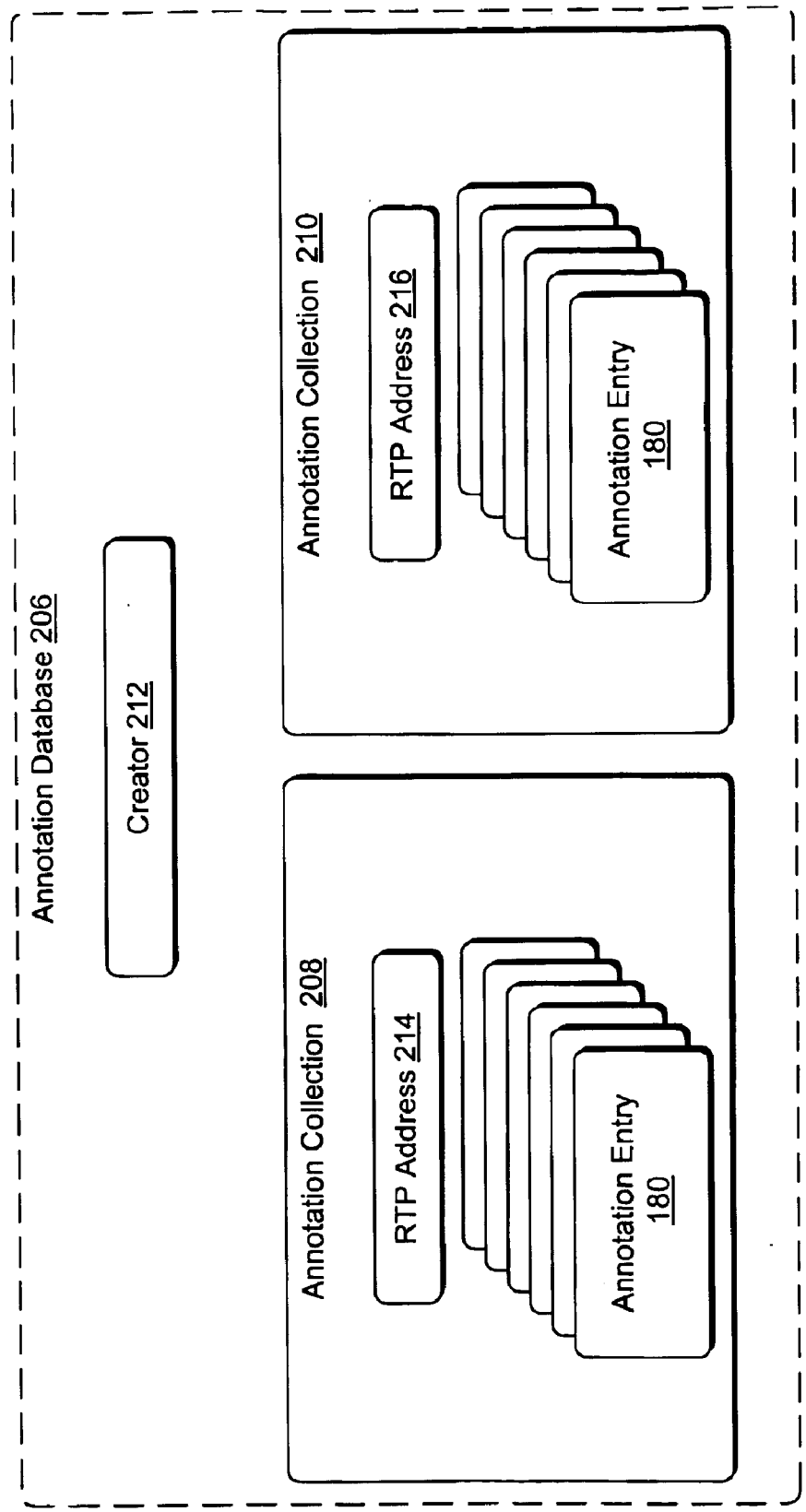
FIG. 5 illustrates implicit annotation collections for annotations maintained by an annotation server of FIG. 3.

FIG. 5 illustrates implicit annotation collections for annotations maintained by annotation server 10 of FIG. 3. A collection of annotations refers to annotation entries 180 of FIG. 4 that correspond to the same media stream(s), based on the media content identifier 200. Annotation entries 180 can be viewed conceptually as part of the same annotation collection if they have the same media content identifiers 200, even though the annotation entries may not be stored together by annotation server 10.

Annotation database 206 includes two annotation collections 208 and 210. Annotation server 10 dynamically adds, deletes, and modifies annotation entries in annotation database 206 based on commands from client 15. Annotation entries can be created and added to annotation database 206 at any time a user cares to comment upon the content of the stream (or another annotation) in the form of an annotation. Annotation server 10 forms an annotation entry from identification data, content data, title data, and author data of an "add annotation" request received from the client's ABE 151 (FIG. 3), and adds the annotation entry to annotation database 206.

Annotation database 206 includes a fields 212, 214, and 216 that specify common characteristics of all annotation entries of database 206 or an annotation collection 208 or 210. Alternatively, fields 212–216 can be included redundantly in each annotation entry 180.

Creator field 212 contains data identifying the user who was responsible for creating annotation database 206.

RTP address fields 214 and 216 contains data representing an RTP address of the media content (e.g., the RTP addresses of each of the different streams contained in version table 204) for the annotation collection. An RTP address provides an alternative mechanism, in addition to the data in identifier field 200 of FIG. 4, for associating the media content with annotation entries 180. In alternative embodiments, RTP address fields 214 and 216 need not be included.

Annotation Notification and Creation

An annotation can be created by a user of any of the client computers 15 of FIG. 1. As discussed above with reference to FIG. 3, client 15 includes an interface module 150 that presents an interface to a user (e.g., a graphical user interface), allowing a user to make requests of annotation server 10. In the illustrated embodiment, a user can access annotation server 10 via an annotation toolbar provided by interface 150.

Figure 6:
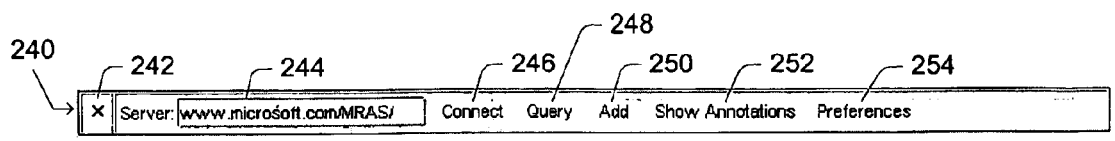
FIG. 6 illustrates an annotation toolbar in accordance with one embodiment of the invention.

FIG. 6 illustrates an annotation toolbar in accordance with one embodiment of the invention. Annotation toolbar 240 includes various identifying information and user-selectable options 242–254.

Selection of an exit or "X" button 242 causes interface 150 to terminate display of the toolbar 240. A server identifier 244 identifies the annotation server with which client 15 is currently configured to communicate (annotation server 10 of FIG. 1. in the illustrated embodiment).

Selection of a connection button 246 causes ABE 151 of FIG. 3 to establish a connection with the annotation server identified by identifier 244. Selection of a query button 248 causes interface module 150 to open a "query" dialog box, from which a user can search for particular annotations. Selection of an add button 250 causes interface module 150 to open an "add new annotation" dialog box, from which a user can create a new annotation.

Selection of a show annotations button 252 causes interface module 150 to open a "view annotations" dialog box, from which a user can select particular annotations for presentation.

Selection of a preferences button 254 causes interface 150 of FIG. 3 to open a "preferences" dialog box, from which a user can specify various UI preferences, such as an automatic server query refresh interval, or default query criteria values to be persisted between sessions.

Figure 7:
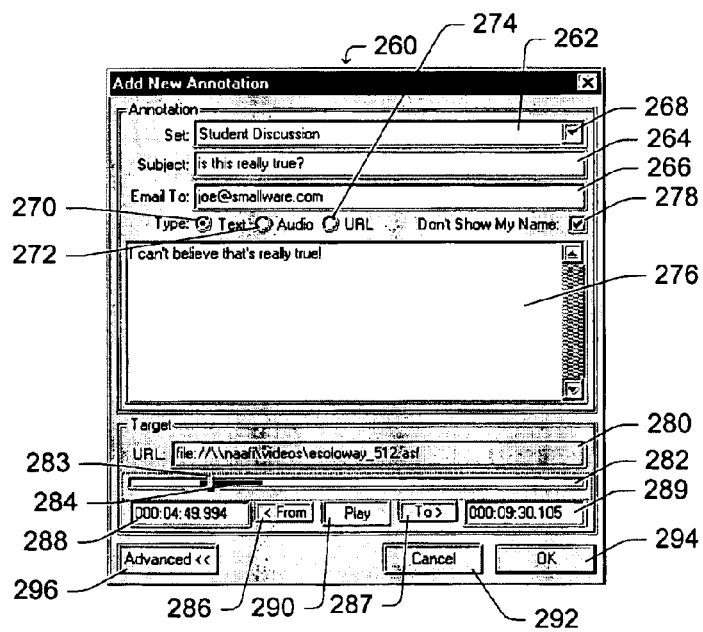
FIG. 7 shows an "add new annotation" dialog box that allows a user to create a new annotation.

FIG. 7 shows an exemplary "add new annotation" dialog box 260 that allows a user to create a new annotation. Dialog box 260 can be presented, for example, in response to user selection of add button 250 of FIG. 6.

Dialog box 260 includes an annotation set identifier 262, a subject line 264, and an email field 266. Annotation set identifier 262 allows the user to identify a named set to which the new annotation will belong. This set can be a previously defined set, or a new set being created by the user. Selection of the particular set can be made from a drop-down menu activated by selection of icon 268, or alternatively can be directly input by the user (e.g., typed in using an alphanumeric keyboard). According to one embodiment of the invention, annotation server 10 of FIG. 3 supports read and write access controls, allowing the creator of the set to identify which users are able to read and/or write to the annotation set. In this embodiment, only those sets for which the user has write access can be entered as set identifier 262. Alternatively, rather than (or in addition to) user selection of an annotation set, one or more annotation sets may be inherently associated with dialog box 260 (or toolbar 240 of FIG. 6) and thus implicitly selected for each new annotation.

Subject line 264 allows the user to provide a short summary or title of the annotation content. Although the subject line is illustrated as being text, it could include any of a wide variety of characters, alphanumerics, graphics, etc. In the illustrated embodiment, subject line 264 is stored in the title field 190 of the annotation entry of FIG. 4.

Email field 266 allows the user to input the email address of a recipient of the annotation. The email addresses indicated in field 266 are provided to ABE 132 of annotation server 10, which in turn generates an email message including the newly created annotation and sends the email message to the recipient(s) indicated in field 266 in addition to adding the annotation to the annotation databases. Alternatively, the email message can be sent directly by client 15 of FIG. 1, or by an intermediary server (such as email server 13 of FIG. 1).

Entries into email field 266 can be made on an individual or a "group" basis. Individual email addresses can be entered directly by the user, or can be selected from a pre-defined list. A list of available email addresses can be made available in any of a variety of conventional manners, such as via a pull-down or drop-down menu, a menu bar option, etc. A pre-defined list of email addresses can be obtained from a variety of different sources. For example, email agent 154 of FIG. 3 may have an "address book" or similar listing of email addresses programmed in by the user or other individuals.

In one implementation, user interface 150 of FIG. 1 can have a list of email addresses associated with it, and/or the annotation set identified by set identifier 262 may have a list of email addresses associated with it. These email addresses associated with either the user interface or the annotation set can be automatically entered as "default" email addresses, or alternatively can be individually selected by the user (e.g., via a pull-down or drop-down menu).

Additionally, a group identifier can be entered into email field 266 to identify a group of email addresses. When the user adds an annotation with a group identifier in email field 266, annotation backend 132 of FIG. 3 (or alternatively another component, such as email server 13 of FIG. 1 or annotation backend 151 of FIG. 3) forwards an email message of the new annotation to each email address that corresponds to the group identifier. Group identifiers can be defined to correspond to email addresses in any of a variety of manners. For example, user interface 150 or the annotation set identified by set identifier 262 may have pre-defined groups associated with them, email agent 154 of FIG. 3 may have pre-defined groups associated with it, etc.

Dialog box 260 further includes an annotation type selector in the form of radio buttons 270, 272, and 274, selection of which creates text annotation, an audio annotation, or a uniform resource locator (URL) annotation, respectively. Although not shown, other types of annotations could also be accommodated, such as graphics, video, etc. The content of the annotation is input to annotation field 276, which is text in the illustrated example of FIG. 7. Additional input controls (not shown) may also be included depending on the type of annotation being created. For example, conventional audio control buttons (such as fast forward, rewind, play, pause, stop, and record) may be included for audio annotations.

Dialog box 260 also includes a checkbox 278 that allows the user to create an anonymous annotation. When checkbox 278 is selected (as illustrated in FIG. 7), the author of the annotation is not stored in author field 182 of FIG. 4. Annotation backend 151 can simply not forward the author information to annotation server 10 of FIG. 3, or alternatively annotation server 10 may simply ignore the author information.

Interface 150 assumes that the current media stream being presented to the user is the media stream to which the new annotation will be associated. The media stream to which an annotation is associated is referred to as the "target" of the annotation. An identifier of this stream is displayed in a target specification area 280 of dialog box 260. Alternatively, a user could change the target of the annotation, such as by typing in a new identifier in target area 280, or by selection of a "browse" button (not shown) that allows the user to browse through different directories of media streams.

A time strip 282 is also provided as part of dialog box 260. Time strip 282 represents the entire presentation time of the corresponding media stream. A "thumb" 283 that moves within time strip 282 indicates a particular temporal position within the media stream. The annotation being created via dialog box 260 has a begin time and an end time, which together define a particular segment of the media stream. This segment is illustrated as darkened portion 284 of time strip 282. When "from" button 286 is selected, thumb 283 represents the begin time for the segment relative to the media stream. When "to" button 287 is selected, thumb 283 represents the end time for the segment relative to the media stream. Alternatively, two different time bars could be displayed, one for the begin time and one for the end time. The begin and end times are also displayed in an hours/minutes/seconds format in boxes 288 and 289, respectively.

Thumb 283 can be moved along time strip 282 in any of a variety of conventional manners. For example, a user can depress a button of a mouse (or other cursor control device) while a pointer is "on top" of thumb 283 and move the pointer along time strip 282, causing thumb 283 to move along with the pointer. The appropriate begin or end time is then set when the mouse button is released. Alternatively, the begin and end times can be set by entering (e.g., via an alphanumeric keyboard) particular times in boxes 288 and 289.

Dialog box 260 also includes a "play" button 290. Selection of play button 290 causes interface module 150 of FIG. 3 to forward a segment specification to web browser 153 of client 15. The segment specification includes the target identifier from target display 280 and the begin and end times from boxes 288 and 289, respectively. Upon receipt of the segment specification from interface module 150, the browser communicates with media server 11 and requests the identified media segment using conventional HTTP requests. In response, media server 11 streams the media segment to client 15 for presentation to the user. This presentation allows, for example, the user to verify the portion of the media stream to which his or her annotation will correspond.

Dialog box 260 also includes a cancel button 292, an OK button 294, and an advanced button 296. Selection of cancel button 292 causes interface 150 to close the dialog box 260, canceling out of the add new annotation process. Selection of OK button 294 causes interface 150 to forward the information entered in dialog box 260 to annotation backend 151, which sends the new annotation information to annotation server 10 of FIG. 3. Interface 150 then closes dialog box 260, the new annotation being entered.

Selection of "advanced" button 296 reduces the number of options available to the user, simplifying dialog box 260. For example, the simplified dialog box may not include fields and buttons 280–290.

As discussed above, when a new annotation is created, an email message is created and sent to each email address identified in email field 266. The email message is a notification to each of the email recipients (as identified by the email addresses/groups in field 266) of the new annotation. Annotation back end 151 of client 15 includes various identifying information for the annotation and its corresponding media content. Some or all of this identifying information may be made visible to the user, or alternatively may be embedded in header or footer sections of the message that are not displayed to the user.

Figure 8:
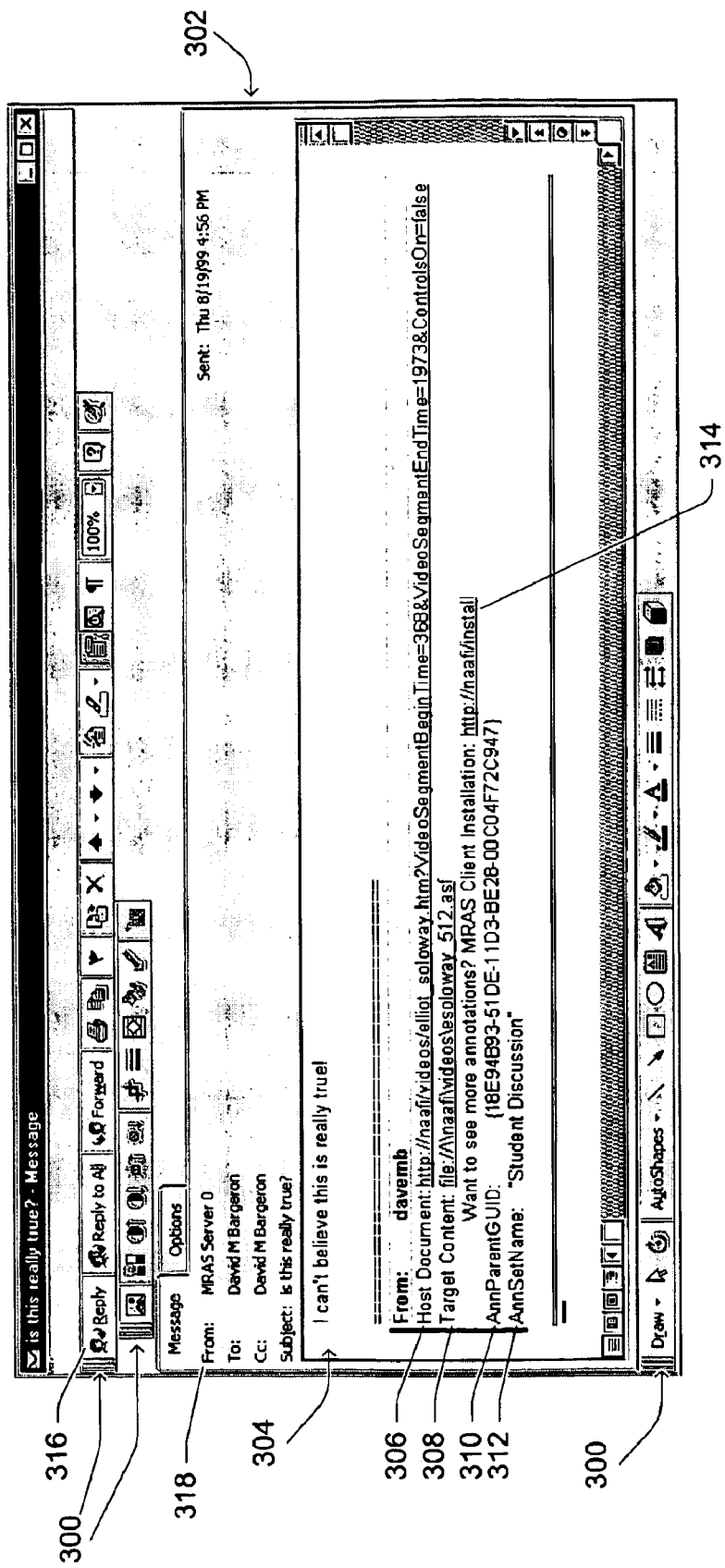
FIG. 8 shows an example email message notification of a new annotation.

FIG. 8 shows an example email message notification of a new annotation. Email interface 155 of FIG. 3 provides various conventional user-selectable options 300 for viewing, creating, and manipulating electronic mail messages. Email interface 155 also displays email message 302 that includes the content 304 of the new annotation (e.g., the text, audio, video, etc.), which is text in the illustrated example. Thus, the recipient of email message 302 can play back or view the new annotation content 304 without having to access the annotation server or the underlying media content. Email message 302 also includes various identifiers and descriptive information regarding the new annotation and the multimedia content to which it corresponds, including a host identifier 306, a target identifier 308, an annotation identifier 310, and an annotation set identifier 312.

Host identifier 306 (such as a uniform resource locator) identifies the host of the media content and a temporal segment of the media content to which the new annotation corresponds. Host identifier 306 is an identifier of the host of the media content (e.g., a URL of a web page that displays the media content) concatenated with time range information, and is presented as a user-selectable link to the media content (e.g., a text or graphic hyperlink). The identifier displayed to the user can be the URL of the media content, or alternatively some other text, graphic, video, etc. identifier of the media content. If the user selects the identifier, email agent 154 of FIG. 3 forwards host identifier 306 to annotation back end 151. Annotation back end 151 forwards host identifier 306 to web browser 153 which in turn accesses streaming media server 11 of FIG. 1 to request the media content and begin playback of the media content to the user. Annotation back end can also access annotation server 10, using host identifier 306, to obtain additional annotations corresponding to the media content. Alternatively, email agent 154 may forward host identifier 306 directly to web browser 153.

Host identifier 306 also identifies the temporal range or segment of the media content with which the new annotation is associated. This temporal range is the beginning and end time for the annotation, displayed in boxes 288 and 289 of FIG. 7. When a user selects host identifier 306 in email message 302, the temporal range information is forwarded to media server 11. Media server 11 then begins streaming the media content to client 15, starting with the temporal location identified by the begin time in host identifier 306. Media server 11 can then continue to stream the remainder of the media content to client 15, or alternatively may stream only the segment identified by the temporal range identifier (defined by the begin and end time for the annotation).

Target identifier 308 (such as a uniform resource locator) identifies the entire media content that the new annotation corresponds to. Target identifier 308 is the target identifier from target display 280 of FIG. 7, and is presented as a user-selectable link to the media content (e.g., a text or graphic hyperlink). If the user selects target identifier 308, email agent 154 of FIG. 3 forwards the URL of the media content to annotation back end 151, which in turn accesses streaming media server 11 of FIG. 1, as well as possibly annotation server 10 and web page server 12, to request the media content and begin playback of the media content to the user.

Annotation identifier 310 uniquely identifies the new annotation. Identifier 310 is assigned by the annotation back end 132 of FIG. 3. Annotation identifier 310 can be used by annotation server 10 if the user selects to create another new annotation by simply "replying" to the email message, as discussed in more detail below. Annotation identifier 310 informs annotation server 10 of which annotation the "reply" annotation corresponds to.

Annotation set identifier 312 indicates the annotation set(s) to which the new annotation corresponds. Identifier 312 can be used by annotation server 10 if the user selects to create another new annotation by replying to email message 302. Identifier 312 informs annotation server 10 which annotation set(s) the "reply" annotation corresponds to.

Email message 302 also includes an installation option 314. Situations can arise where the recipient of email message 302 does not have the necessary modules (e.g., interface 150 and annotation backend 151 of FIG. 3) to present annotations to a user concurrent with the corresponding multimedia content. Installation option 314 is a user-selectable link (e.g., a text or graphic hyperlink), that identifies an installation program (e.g., at annotation server 10). If the user selects installation option 314, email agent 154 of FIG. 3 forwards the selected URL to web browser 153, which in turn access the appropriate server (e.g., annotation server 10). The installation program can then run, installing the appropriate modules on the client computer 15.

In addition to using email message 302 to play back annotations and/or corresponding media content, the recipient of electronic mail message 302 can also create an additional annotation by "replying" to message 302. This "reply" is generated by user selection of the conventional "reply to sender" or "reply" option provided by email interface 155, which is typically available in conventional email user interfaces, such as "reply" button 316. When the user selects to reply, the sender 318 of the original email message (annotation server 10) is entered as the recipient of the reply message. The user can then enter in a new annotation via the email interface 155 (which can be text, audio, video, or any media format supported by the email interface 155 and agent 154). When the user finishes entering the additional annotation, the user selects the "send" option which forwards the reply message to annotation server 10. Annotation server 10 stores this additional annotation, creating an annotation entry 180 of FIG. 3 for the new annotation. In the illustrated embodiment, this new annotation identifies, in the related annotation identifier field 196 of FIG. 5, the original annotation that was created when the original email message was sent by annotation server 10.

Figure 9:
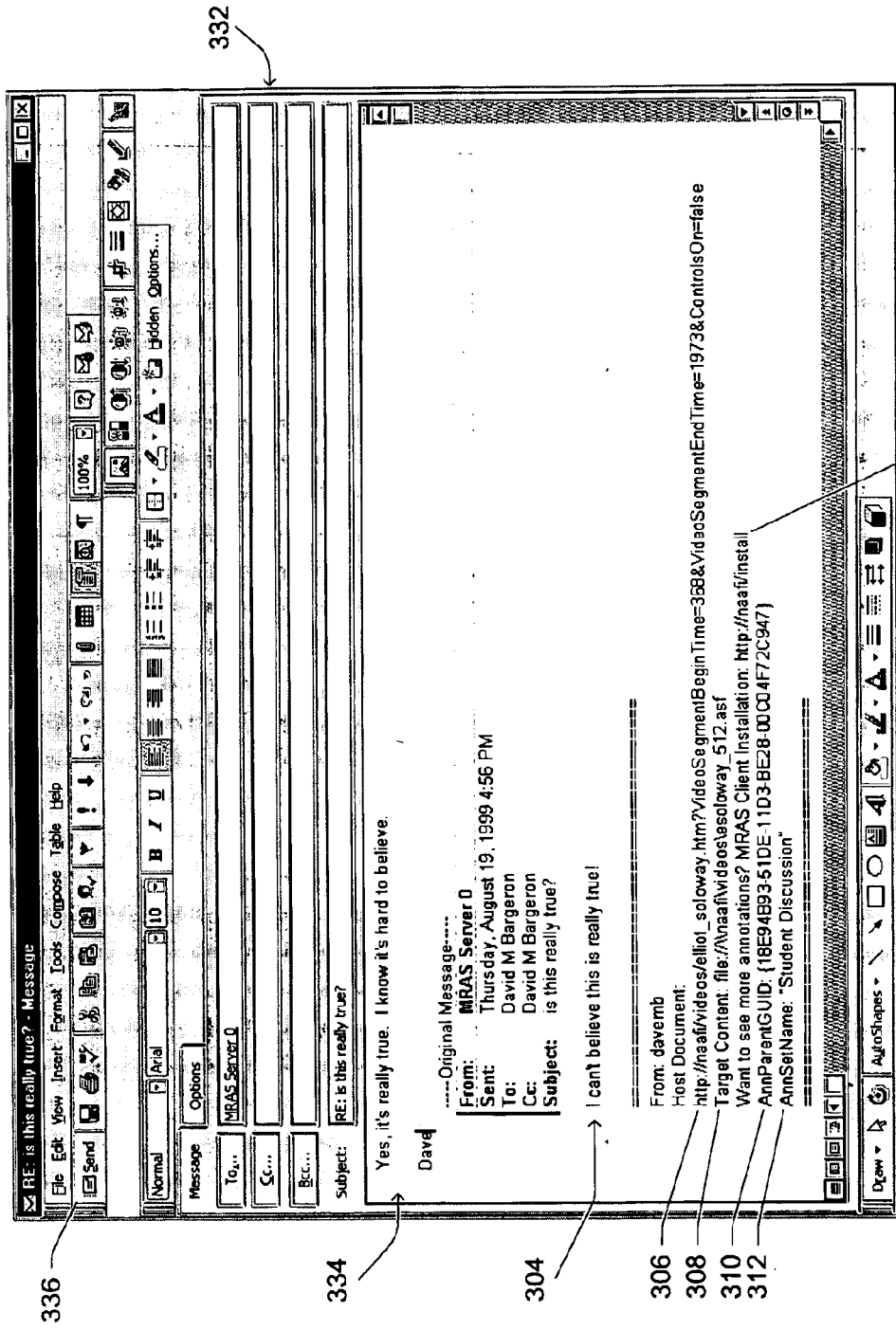
FIG. 9 shows an example email reply message including a new annotation.

FIG. 9 shows an example email reply message including a new annotation. Email reply message 332 includes the content 304 of the original annotation (e.g., the text, audio, video, etc.), as well as the identifiers 306–314 of the original annotation. Reply message 332 further includes additional new content 334 for another new annotation. When the user selects "send" button 336, the reply message 332 is forwarded to annotation server 10.

Upon receipt of electronic mail reply message 332, annotation server 10 creates another new annotation and uses the reply message content 334 as the content for this new annotation. The author of the new annotation is the sender of reply message 332. Annotation server 10 uses identifiers 306–312 describing the original annotation (from email message 302 of FIG. 8) as needed to create a new annotation entry 180 of FIG. 4. Annotation server 10 associates this new annotation with the same media content as the annotation in the original email (as identified by target identifier 308 and host identifier 306 of FIG. 8). Annotation server 10 also associates this new annotation with the same temporal range as the annotation in the original email (as identified by host identifier 306 of FIG. 8). Annotation server 10 further identifies, as a related annotation, the original annotation that was created when the original mail message was sent by annotation server 10 (as identified by annotation identifier 310 of FIG. 8). Annotation server 10 also associates the new annotation with the same annotation set(s) as the original annotation message (as identified by annotation set identifier 312 of FIG. 8).

Alternatively, annotation server 10 may obtain the annotation identifier of the original annotation from the reply message 332 and access the annotation entry 180 of FIG. 4 with that identifier. Information from that annotation entry is then used to create the new entry (e.g., fields 184–190, 196, and 198 of FIG. 4 are copied to the new annotation entry).

In the illustrated examples of FIGS. 8 and 9, various identifiers 306–314 are presented to the user. Alternatively, one or more of these identifiers may be included in the email messages but hidden from view. For example, one or more "hidden" or "invisible" properties or parameters may be included in the email message which are accessible by email agent 154 but are not displayed to the user.

Figure 10:
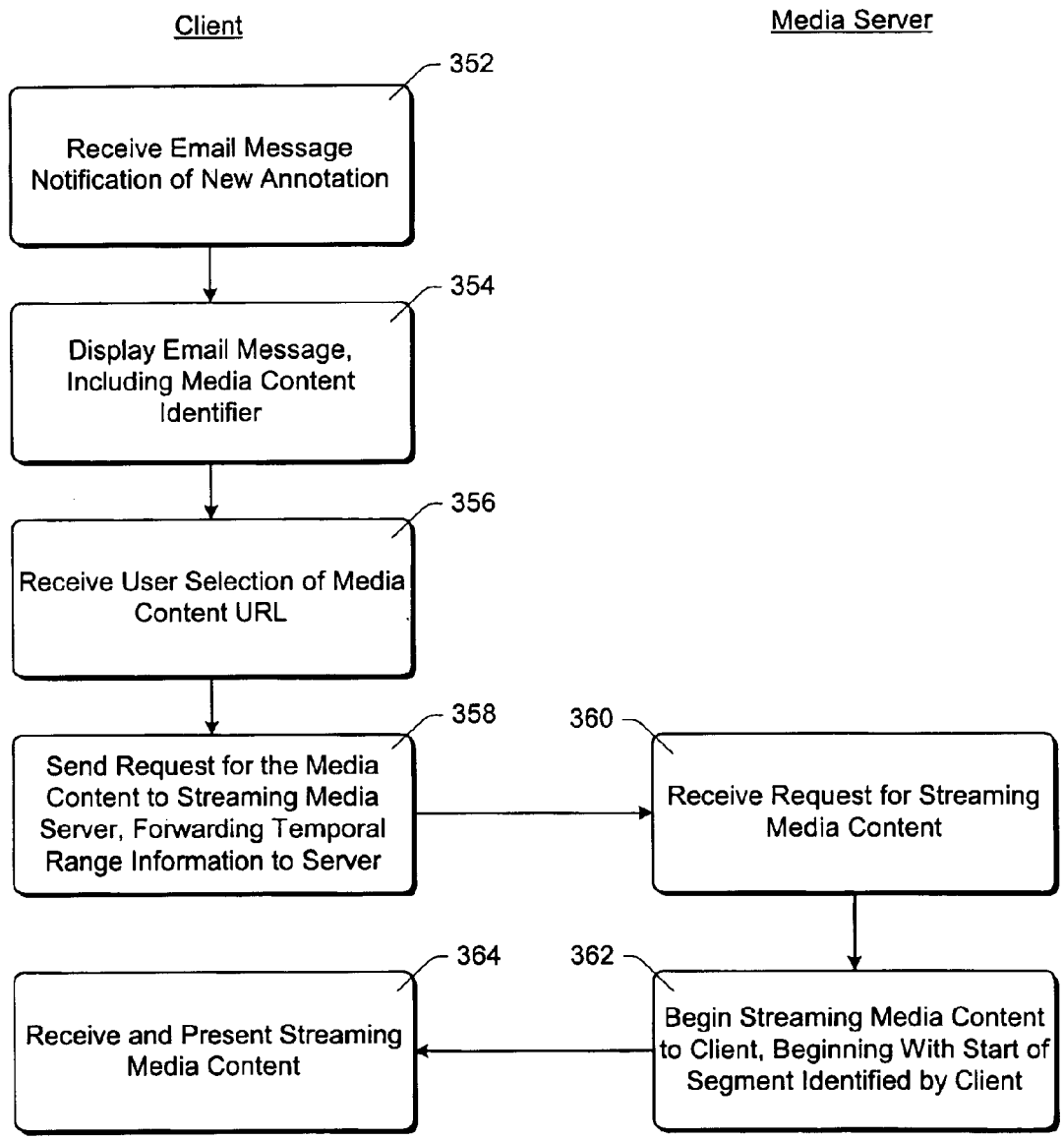
FIG. 10 is a flowchart illustrating exemplary steps in accessing media content from an email message in accordance with the invention.

FIG. 10 is a flowchart illustrating exemplary steps in accessing media content from an email message in accordance with the invention. The steps on the left side of FIG. 10 are implemented by client computer 15 of FIG. 1, and the steps on the right side of FIG. 10 are implemented by streaming media server computer 11. The steps of FIG. 10, on both client and server computers, may be performed in software. FIG. 10 is described with additional reference to components in FIG. 1.

An email message notification of a new annotation is received at the client (step 352). This email message notification of the new annotation includes the content of the new annotation, an URL of the corresponding media content, a temporal range identifier for the new annotation, and an identifier of the annotation. The client displays the email message via email interface 155, including a user-selectable identifier of the media content (step 354).

In the illustrated example of FIG. 10, assume that the user selects the identifier of the media content. The user-selection of the identifier is received by the client (step 356), which in turn sends a request for the media content to the streaming media server (step 358). The request for media content includes the temporal range identifier that identifies the segment of the media content that the annotation corresponds.

The request for media content, including temporal range information, is received by the media server (step 360). The media server then begins streaming the requested media content to the client, beginning with the starting point of the segment identified by the temporal range information (step 362). The streaming media content is received by and presented by the client (step 364).

In addition, other types of email messages that are not direct replies to an email notification message can be used to add new annotations. Typical email applications provide a user with a "forward" option that allows the user to send a received email message to one or more other users, optionally appending an additional message by the user. Such email messages can be forwarded from user to user, creating a string of email messages often referred to as an "email thread". Such forwarding can be found in numerous settings, such as system designers that carry on "conversations" or discuss various options with one another via such email messages. Thus, an original annotation notification email message can be forwarded around to multiple additional users. The annotation server, however, is not aware of such additional messages in an email thread unless the annotation server is listed as a recipient of the messages (due to either replying to or forwarding of a message). If one of the users forwarding the email thread, however, were to forward the thread to the annotation server, then all of the email messages in the thread so far could be added as annotations.

Figure 11:
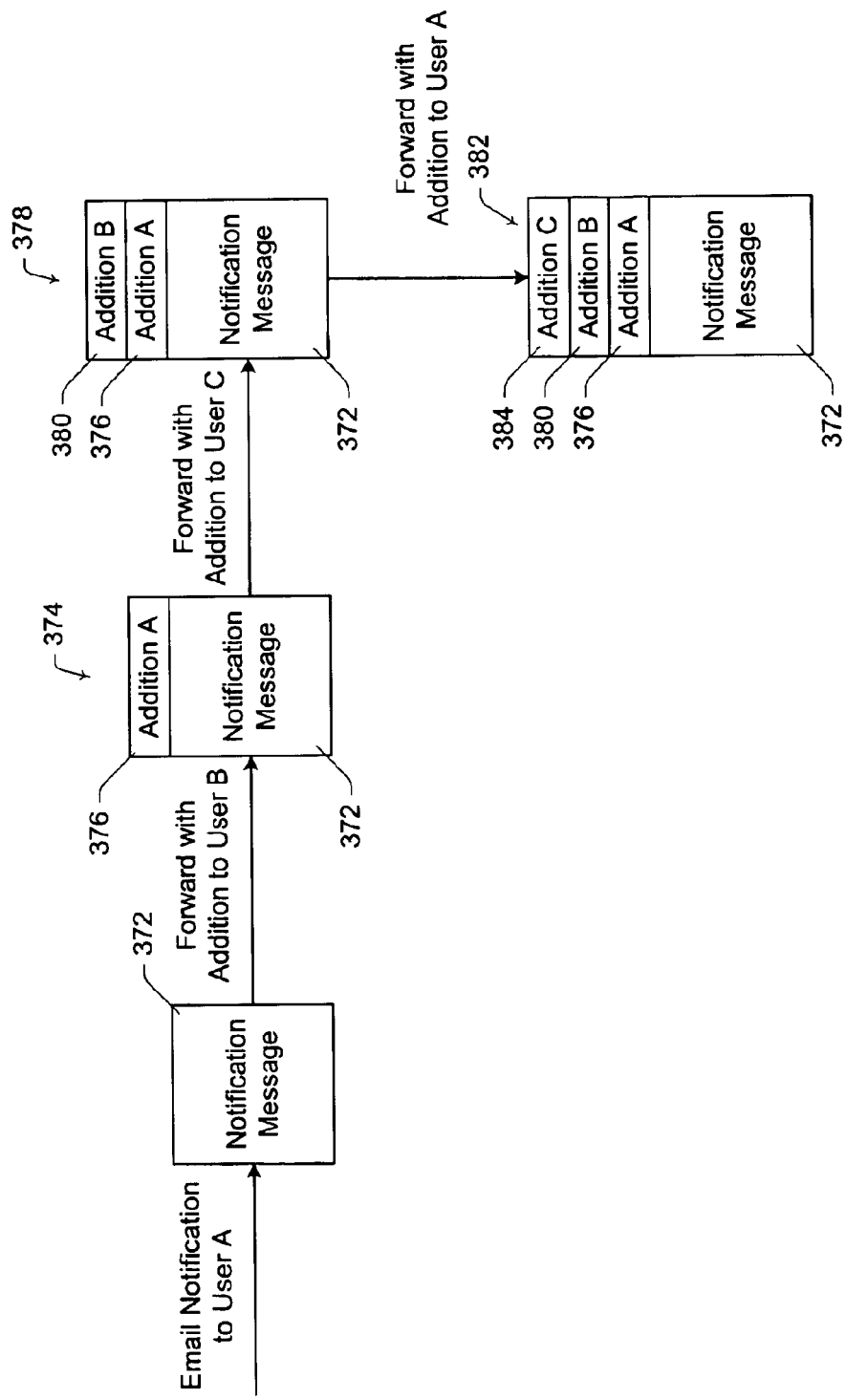
FIG. 11 is an exemplary diagram illustrating the creation of an email thread.

FIG. 11 is an exemplary diagram illustrating the creation of an email thread. Initially, an email notification message 372 of a new annotation is sent from the annotation server to user A. Upon receipt of the message 372, user A comments on the new annotation and forwards it to user B. User B thus receives an email message 374 including the content of the original email notification message 372 as well as the additional content 376 added by user A. User B similarly comments on the new annotation and the comments of user A and forwards the email message to User C. User C thus receives an email message 378 including the content of the original email notification message 372, the additional content 376 added by user A, and the additional content 380 added by user B. User C can similarly add additional content to the email message thread, and forward a message 382 including the original email notification message 372, the additional content 376 added by user A, the additional content 380 added by user B, and the additional content 384 added by user C.

Upon receipt of the email message 382, user A can decide to forward the message 382 to annotation server 10 of FIG. 3. By forwarding the message 382, which is an email thread including multiple email messages from multiple users, annotation server 10 can add the email messages from the thread into one or more annotations. Thus, even though some of the email messages were not forwarded to annotation server 10, they can subsequently be added to annotations.

When annotation server 10 receives an email thread such as message 382, it generates one or more annotations based on the identifying information in the thread. As the original email message 372 was an annotation notification email message, message 372 includes identifying information for the original annotation, including media content identifier and temporal range identifier. This identifying information is used for all additional annotations that are created from message 382.

Annotation server 10 analyzes the message 382 and determines the portion that was not part of the original annotation notification email message 372, and creates an additional annotation for this portion. Alternatively, annotation server 10 may use all of message 382 to create a single annotation. In another alternative implementation, annotation server analyzes the message 382 to identify each individual addition to the original email notification message (based, for example, on header information in each message) and creates a separate annotation for each addition. Other alternative implementations may also be used, such as grouping additions by the same user into the same annotation, etc.

The forwarding of messages illustrated in FIG. 11 can occur with any time delays between forwardings. For example, user A may forward message 374 to user B two minutes or two years after receiving the email notification message 372.

Additionally, a user may generate new annotations from email messages that are not a reply to or forwarding of another email message. In order to generate such an annotation, sufficient information needs to be included in the email message to allow annotation server 10 to generate the annotation. Specifically, identifying information of the media content to which the annotation corresponds needs to be identified to annotation server 10. Additional information may also optionally be required, such as a temporal range identification for the annotation and annotation set identification.

This information can be included in the email message in a variety of manners. In one implementation, the information is manually put into the message by the user, such as by input from a keyboard or by using a "cut and paste" methodology. Alternatively, web page server 12 of FIG. 1 may provide the multimedia player interface of FIG. 13, which may display as part of the interface the necessary identifying information. One selection of the multimedia player interface may be a "new annotation" form that can be selected by the user. The web page server 12 includes, visible or invisible to the user, the necessary identifying information for annotation server 10 to generate a new annotation.

In another alternative implementation, the email agent 154 of FIG. 3 may communicate with the web page server 12 or streaming media server 11 to obtain the necessary identifying information for annotation server 10 to generate the new annotation.

Figure 12:
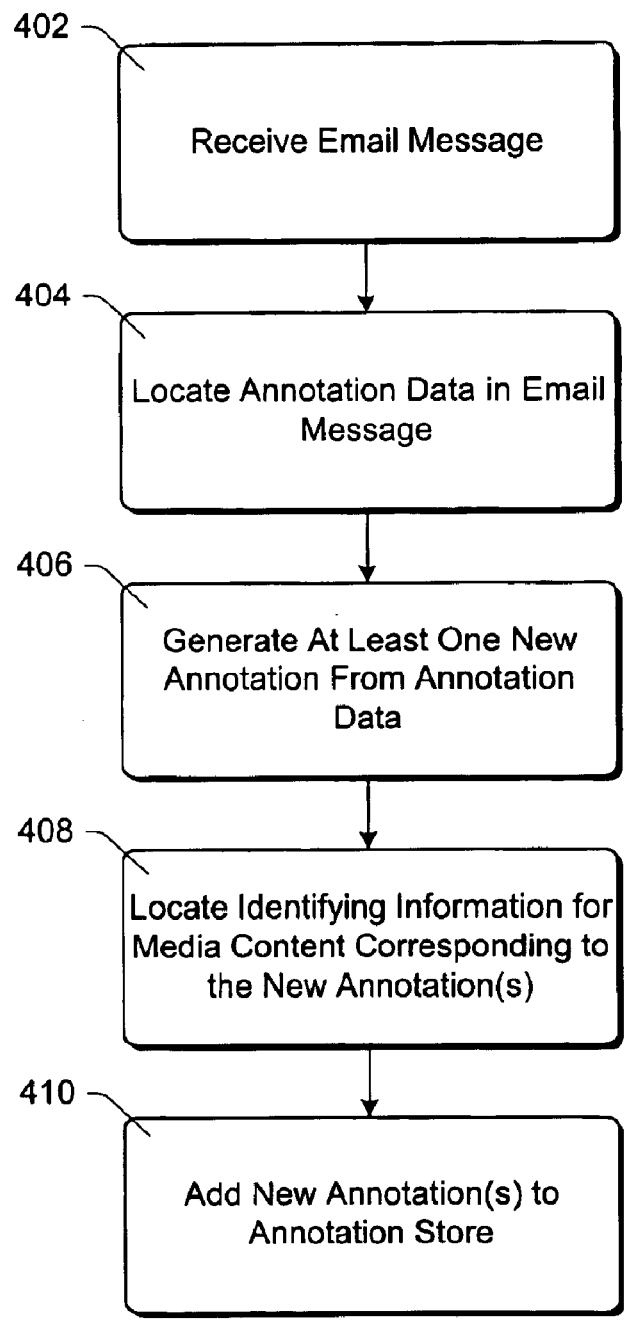
FIG. 12 is a flowchart illustrating an exemplary process in adding new annotations from an email message in accordance with the invention.

FIG. 12 is a flowchart illustrating an exemplary process in adding new annotations from an email message in accordance with the invention. The process is implemented by annotation server 10 of FIG. 3, and may be performed in software. FIG. 12 is described with additional reference to components in FIG. 3.

Initially, the annotation server receives an email message with annotation content (step 402). The annotation server analyzes the email message and locates the annotation data in the email message (step 404), generating at least one new annotation from the annotation data in the email message (step 406). The number of annotations generated can vary (e.g., depending on whether the email message is an email thread).

The annotation server also locates identifying information for media content corresponding to the new annotation(s) (step 408). The identifying information includes both the media content identifier and the temporal range identifier. This identifying information is used for each new annotation created. The annotation server then adds these new annotation(s) to the annotation store (step 410).

Annotation and Media Segment Retrieval

Figure 13:
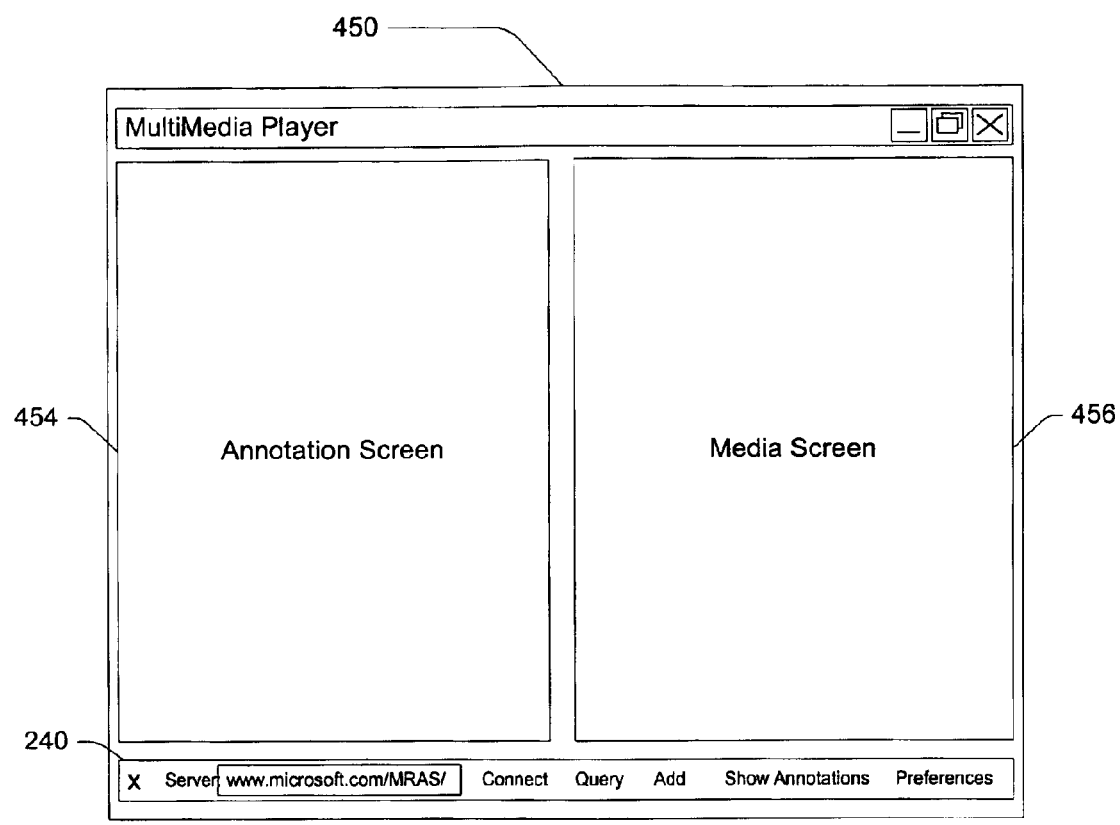
FIG. 13 is a diagrammatic illustration of a graphical user interface window displaying annotations and corresponding media segments concurrently in accordance with the invention.

FIG. 13 shows one implementation of a graphical user interface window 500 that concurrently displays annotations and corresponding media segments. This UI window 500 has an annotation screen 454, a media screen 456, and a toolbar 240.

Media screen 456 is the region of the UI within which the multimedia content is rendered. For video content, the video is displayed on screen 456. For non-visual content, screen 456 displays static or dynamic images representing the content. For audio content, for example, a dynamically changing frequency wave that represents an audio signal could be displayed in media screen 456.

Annotation screen 454 is the region of the UI within which the annotations are rendered. For video, graphical, and text annotations, the video, graphical, or text content of the annotation is displayed on screen 454. For non-visual content, screen 454 displays static or dynamic images representing the annotation content, such as the title or summary of the annotation, or a dynamically changing frequency wave in the case of audio content.

Conclusion

The invention described above provides for the creation and notification of new annotations via electronic mail (email). A user, in creating a new annotation, can identify one or more other users that are to receive an email notification of the new annotation. Upon receiving such an email notification, the recipient(s) can advantageously access, via a single user-selectable link, the temporal segment of multimedia content corresponding to the new annotation. Furthermore, additional annotations can advantageously be generated from email, by replying to an email notification of a new annotation, by sending a new email message or by forwarding an email message or email thread, etc.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system comprising:
   a client computer to playback multimedia content and annotations corresponding to different temporal portions of the multimedia content; and
   an annotation server, coupled to the client computer, to,
      maintain an annotation database having a plurality of annotations corresponding to the multimedia content,
      provide the plurality of annotations to the client computer for playback,
      send electronic mail messages including annotations to recipients identified by the client computer,
      analyze electronic mail messages that are received not in reply to a previous electronic mail message that included annotation data, to locate data in the electronic mail messages, generate new annotations that include the located data but no new annotation data, and add the new annotations to the annotation database.

2. A system as recited in claim 1, further comprising a media server to manage streaming the multimedia content to the client computer, wherein streaming the multimedia content comprises the multimedia content being communicated to the client computer on an as-needed basis rather than being pre-delivered in its entirety prior to beginning playback of the multimedia content.

3. A system as recited in claim 1, further comprising a network coupling the client computer to the annotation server.

4. A system as recited in claim 1, wherein the client computer is further to:

present an electronic mail message including a multimedia content identifier to a user, receive a user selection of the multimedia content identifier, access a media server to obtain the multimedia content, and playback the multimedia content to the user.

5. A system as recited in claim 4, wherein the client computer is further to transmit, to the media server, an identifier of a temporal segment of the multimedia content that is after the beginning of the multimedia content, and wherein the media server is to stream to the client computer the multimedia content beginning with the identified temporal segment.

6. A method comprising:

receiving data for a new annotation corresponding to a temporal range of media content;

generating an electronic mail message including,
the content of the new annotation,
an identifier of the media content, and
an installation option that identifies an installation program that can be used to install one or more modules allowing the content and corresponding media content to be rendered; and forwarding the electronic mail message to a recipient identified by the data.

7. A method as recited in claim 6, wherein the generating further comprises including, in the electronic mail message, an identifier of the new annotation.

8. A method as recited in claim 6, wherein the generating further comprises including, in the electronic mail message, an identifier of the temporal range of media content.

9. One or more computer-readable memories containing a computer program that is executable by a processor to perform the method recited in claim 6.

10. A method as recited in claim 6, wherein the installation option comprises a user-selectable link that identifies the installation program.

11. A system as recited in claim 1, wherein each generated new annotation includes:

an author field including data identifying an author of the new annotation, a creation time field including data identifying the time at which the new annotation is generated, a title field including data identifying a title of the new annotation, a content field including the located data, and a media content identifier field including data identifying the multimedia content to which the new annotation corresponds.

12. A method comprising:

receiving an electronic mail notification of a new annotation corresponding to media content, the new annotation corresponding to one of a plurality of temporal segments of the media content that is after the beginning of the media content;

presenting the electronic mail notification to a user;

receiving a user selection of an identifier, within the electronic mail notification, of the media content; and accessing, in response to the user selection, a media server to stream, for rendering to the user, the media content beginning with the one of the plurality of temporal segments that corresponds to the new annotation.

13. A method as recited in claim 12, wherein the presenting comprises displaying annotation content for the new annotation to the user.

14. A method as recited in claim 12, wherein the presenting comprises:

displaying annotation content for the new annotation to the user; and displaying a plurality of identifiers to the user, the plurality of identifiers including:
a content identifier that identifies the media content;
a range identifier that identifies a temporal range of the segment corresponding to the new annotation;
an annotation identifier that identifies the new annotation; and
an annotation set identifier that identifies one or more of a plurality of annotation sets, corresponding to categories for annotations, that the new annotation is part of.

15. A method as recited in claim 14, wherein the content identifier comprises a uniform resource locator (URL).

16. A method as recited in claim 12, wherein the receiving a user selection comprises receiving a user selection of a uniform resource locator (URL) of the media content.

17. A method as recited in claim 12, wherein the receiving a user input comprises receiving a user selection of an identifier of the annotation.

18. One or more computer-readable media having stored thereon a computer program that, when executed by one or more processors, calises the one or more processors to perform functions including:

receiving an electronic mail notification of a new annotation corresponding to media content, wherein the electronic mail notification includes a user-selectable identifier of the media content;

displaying the electronic mail notification;

receiving a user selection of the identifier; and automatically accessing, in response to the user selection of the identifier of the media content, a media server indicated by the identifier to begin, at a point in the media content after the beginning of the media content and corresponding to the new annotation, streaming the media content for presentation to the user.

19. One or more computer-readable media as recited in claim 18, wherein the user-selectable identifier comprises a uniform resource locator (URL) that identifies a server and a location at the server where the media content is located.

20. A system comprising:

an interface module to receive data regarding a new annotation corresponding to media content;

a module to generate an electronic mail message regarding the new annotation, the electronic mail message including, the new annotation content,
a user-selectable link to the media content, wherein the link includes
an identifier of the media content to which the new annotation corresponds, and an identifier of a temporal range of the media content that the new annotation content is associated with, wherein the temporal range corresponds to a location of the media content that is after the beginning of the media content and at which rendering of the media content should begin in response to selection of the link in the electronic mail message.

21. A system as recited in claim 20, wherein the electronic mail message further includes a unique identifier of the new annotation.

22. A system as recited in claim 20, wherein the electronic mail message further includes an identifier of one or more of a plurality of annotation sets, corresponding to categories for annotations, that the new annotation is associated with.

23. A system as recited in claim 20, wherein the system comprises an annotation server computer.

24. A system as recited in claim 20, wherein the system comprises a client computer and wherein the interface module comprises a user interface.

25. A method comprising:
receiving an electronic mail notification of an annotation corresponding to media content;
replying to the electronic mail notification to generate a new annotation corresponding to the media content;
including, in the reply, an identifier of one or more annotation sets of a plurality of annotation sets that the new annotation is associated with, wherein the annotation sets correspond to categories for annotations; and
displaying a default recipient, corresponding to the identified one or more annotation sets, that is to receive an electronic mail notification of the new annotation.

26. A method as recited in claim 25, wherein the replying includes:
obtaining, from the electronic mail notification, an identifier of the annotation; and
including the identifier of the annotation in the reply.

27. A method comprising:
receiving an electronic mail thread including a plurality of electronic mail messages;
creating, after the plurality of electronic mail messages have been included in the electronic mail thread, a plurality of annotations from the plurality of electronic mail messages in the electronic mail thread; and
adding the plurality of annotations to an annotation database.

28. A method as recited in claim 27, wherein:
the creating comprises generating, for each of the plurality of electronic mail messages, an annotation; and
the adding comprises adding each of the generated annotations to the annotation database.

29. A method as recited in claim 27, further comprising locating, in the electronic mail thread, an identifier of media content that the annotation corresponds to.

30. One or more computer-readable media having stored thereon a computer program that, when executed by one or more processors, causes the one or more processors to perform functions including:
receiving an electronic mail message that is not in reply to a previous electronic mail message;
locating data in the received electronic mail message;
generating a new annotation from the located data in the electronic mail message, wherein the new annotation includes the located data but no new annotation data; and
adding the new annotation to an annotation store.

31. One or more computer-readable media as recited in claim 30, wherein the computer program further causes the one or more processors to perform functions including:
creating a new annotation based on the extracted annotation content and the annotation identification information; and
adding the new annotation to an annotation database.

32. One or more computer-readable media as recited in claim 30, wherein the located data comprises:
an identifier of media content to which the annotation content corresponds and of a temporal segment, corresponding to the annotation content, of the media content; and
an identifier of an annotation set that a new annotation including the extracted annotation content is to be part of, wherein the annotation set is one of a plurality of annotation sets corresponding to categories for annotations.

33. A method comprising:
receiving an electronic mail message including data corresponding to media content that is not included in the electronic mail message;
locating the data in the electronic mail message;
generating, after locating the data, a new annotation corresponding to the media content, wherein the new annotation includes,
an author field including data identifying a sender of the electronic mail message as an author of the new annotation,
a creation time field including data identifying the time at which the new annotation is generated,
a title field including data identifying a title of the new annotation,
a content field including the located data but no new annotation data, and
a media content identifier field including data identifying the media content to which the new annotation corresponds.

* * * * *